United States Patent
Ramaswamy et al.

(10) Patent No.: US 6,311,150 B1
(45) Date of Patent: Oct. 30, 2001

(54) METHOD AND SYSTEM FOR HIERARCHICAL NATURAL LANGUAGE UNDERSTANDING

(75) Inventors: Ganesh N. Ramaswamy, Ossining, NY (US); Jan Kleindienst, Kladno-Krochehlavy (CZ)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/389,789

(22) Filed: Sep. 3, 1999

(51) Int. Cl.$^7$ .............................. G06F 17/20; G06F 21/00
(52) U.S. Cl. ................................. 704/1; 704/257
(58) Field of Search ............................ 704/1, 2, 9, 255, 704/257

(56) References Cited

U.S. PATENT DOCUMENTS

| | | | |
|---|---|---|---|
| 5,535,120 | * | 7/1996 | Chong et al. ............................ 704/2 |
| 5,555,169 | * | 9/1996 | Namba et al. ........................... 704/9 |
| 5,613,036 | * | 3/1997 | Strong .................................. 704/257 |
| 5,642,519 | * | 6/1997 | Martin .................................. 704/257 |
| 5,729,659 | * | 3/1998 | Potter .................................. 704/270 |

OTHER PUBLICATIONS

Papineni et al., "Feature–Based Language Understanding," Proc. Eurospeech 1997.

* cited by examiner

*Primary Examiner*—Patrick N. Edouard
(74) *Attorney, Agent, or Firm*—F. Chau & Associates, LLP

(57) ABSTRACT

A method for hierarchical translation of input to a formal command in natural language understanding systems includes presenting an input command to be translated to a natural language understanding engine. At least two translator levels are provided in the natural language understanding engine. A first translator level of the at least two translator levels translates the input command into at least one category by associating the input command with the at least one category for the next level of translators. A formal language command is output for the input command from a last of the at least two translator levels based on the input command and the at least one category.

37 Claims, 4 Drawing Sheets

METHOD AND SYSTEM FOR HIERARCHICAL NATURAL LANGUAGE UNDERSTANDING

BACKGROUND OF THE INVENTION

1. Field of the Invention

The present invention relates to natural language understanding systems, and more particularly to a method and system for building a natural language understanding system with hierarchical translation of commands to improve speed and accuracy of translations.

2. Description of the Related Art

State-of-the-art natural language understanding systems typically perform a direct translation of the user input to a formal command in a single step. However, when the number of formal commands is large, a large number of features may be required to perform a direct one-step translation. Increasing the number of features introduces additional statistical noise that results in a degradation of accuracy of the system. Additional computational difficulties include added computation time and memory, and possible numerical instability due to the large number of features. Consider for example translating commands such as "forward this message" (action), "how do I forward a message" (help), or "did I forward a message" (query). All three of these sentences are related to forwarding a message, and as such the key word "forward" may appear to be important, but a feature set including the word "forward" would only introduce noise and lead to inaccuracies in the translation.

Therefore, a need exists for a system and method for reducing a number of features needed to translate a command in a natural language understanding system. A further need exists for a hierarchical translation method and system for translating command in a faster and more accurate manner.

SUMMARY OF THE INVENTION

A method for hierarchical translation of input to a formal command in a natural language understanding system, which may by implemented by a program storage device readable by machine, tangibly embodying a program of instructions executable by the machine to perform the method includes presenting an input command to be translated to a natural language understanding engine. At least two translator levels are provided in the natural language understanding engine. The input command is translated into at least one category by a first translator level of the at least two translator levels by associating the input command with the at least one category for a next level of translators. A formal language command is output for the input command from a last of the at least two translator levels based on the input command and the at least one category.

In other methods which may be implemented with a program storage device, the step of providing at least two translator levels may include providing N translator levels where N is defined as a system parameter. The step of translating the command into at least one category may include the step of providing a plurality of models. Each model is preferably associated with a category, and each category may include a subset of formal language commands to narrow a search space for determining the formal language command corresponding to the input command. The step of applying the formal language command to at least one application may be included. The at least one category may include formal language command entries relevant to at least one application and may further include the step of applying the formal language command entries to the at least one application in accordance with the input command. The at least one category may include all entries for the input command and may further include the step of associating a first portion of the entries with the at least one category by providing a formal command for each of the entries relevant for the at least one category. The step of mapping a second portion of the entries to an error command may also be included.

In still other methods, the at least one category may include a do nothing category, and a formal language command may be outputted by the step of outputting a do nothing command associated with incomplete and improper input commands. The at least one category may include a general category for addressing ambiguous commands, commands relevant to multiple categories and system related commands. The at least two translator levels may search for a category selection for a next translator level or may search for the formal language command for the last level, the category selection being limited to a given category from a previous level translator thereby narrowing a search space for each translator level to improve speed and accuracy.

Another method for hierarchical translation of input to a formal command in a natural language understanding system includes the steps of presenting an input command to be translated to a natural language understanding engine, providing a plurality of translator levels in the natural language understanding engine, providing a plurality of categories for each translator level, each category including a group of formal language commands stored in at least one model, associating the input command with the categories for a given translator level, scoring a probability of correct translation for each of the at least two categories, selecting a category of the at least two categories yielding a highest score, associating the input command with the selected category for a next level of translators and outputting a formal language command for the input command from a last of the translator levels based on the input command and the selected category.

In other methods, the step of providing a plurality of translator levels may include providing N translator levels where N is defined as a system parameter. Each category may include a subset of formal language commands to narrow a search space for determining the formal language command corresponding to the input command. The step of applying the formal language command to at least one application may be included. The categories may include formal language command entries relevant to at least one application and may further include the step of applying the formal language command entries to the at least one application in accordance with the input command. The at least two categories may include all entries for the input command and may further include the step of associating a first portion of the entries with a given category by providing a formal command for each of the entries relevant for the given category. The step of mapping a second portion of the entries to an error command may also be included. The step of selecting a category of the at least two categories yielding a highest score may include the step of selecting a category with a lower score if a translation error is encountered for a category or categories yielding a higher score. If a translation error is encountered for all scored categories, a do nothing category may be selected.

In still other methods, at least one category includes a do nothing category and the step of outputting a formal language command may include the step of outputting a do nothing command associated with incomplete and improper input commands. The method may further invlude the step of assigning formal language commands to multiple categories to protect against translation errors in intermediate levels of the plurality of translator levels. The above methods may be performed by a program storage device readable by machine, tangibly embodying a program of instructions executable by the machine to perform the method steps.

A method for building hierarchical models for translating an input command to a formal command in a natural language understanding system includes the steps of collecting training data from a domain of inputs, separating the training data into translation levels, the translation levels arranged to provide a given output at each level for associating the inputs to a category, the training data including the inputs and an associated formal language command for each input, for each translation level, indicating categories for searching for a formal language command by dividing up a formal language command search space and associating the categories with each input and associating each input with the formal language command in a last translation level.

In other methods, the step of indicating categories for searching for a formal language command may include the step of constructing the categories based on applications supported by the natural language understanding systems. The step of constructing the categories based on applications supported by the natural language understanding systems may include the step of constructing subcategories based on a task intended by user input. The step of indicating categories for searching for a formal language command may include the step of constructing the categories based on a nature of a user's input. The method may include the step of packaging models for each category such that models of categories are capable of being added or removed without affecting models of other categories.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
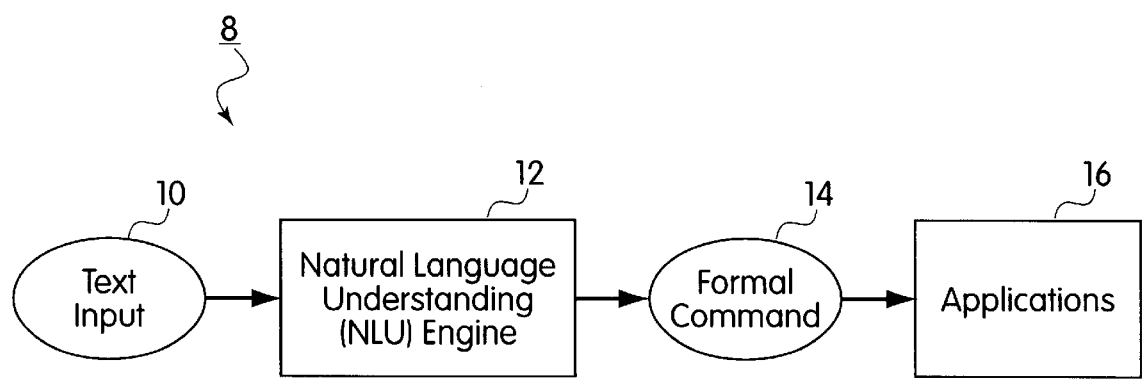
FIG. 1 is a block diagram of an illustrative system showing a natural language understanding engine for employing the present invention.

The present invention provides a system and method for handling complex natural language understanding tasks, and performs these tasks in a faster and more accurate manner.

To handle the complex natural language understanding tasks, the present invention performs the natural language understanding in a hierarchical manner. The hierarchy may include two or more levels of translation. For example, the translation process is split into two levels. To demonstrate, by way of example, the example commands stated above are considered. These include "forward this message" (action), "how do I forward a message" (help), and "did I forward a message" (query). The first level of translation may be responsible for deciding which category (action, help or query) the sentence belongs to, and the presence or absence of features such as "how do I" and "did I" may be employed to make the decision. Once the category is determined, level 2 of the translation is employed which determines the command itself, for which features such as "forward", etc. may be employed.

When appropriate, more than two levels may be utilized in the hierarchical translation. The hierarchical approach of the present invention permits the total number of features at each level to be maintained at a smaller number than the number of features needed in a direct one-step translation. The features are selected very efficiently to perform the limited tasks at each level. The small number of features at each level reduces the noise problem, reduces computational complexity, and also reduces numerical instability problems.

In addition, the hierarchical models (for each level) also permit efficient packaging of the models. For example, a system built for handling the action and the query commands may also include the help commands which can be added at a later time. To implement this, the level 2 models for action and query are unchanged, and a new level 2 model for the help category is incorporated. Minimal changes to the level 1 model are made to include the new help category. If the hierarchical approach of the present invention were not employed, it would be necessary to rebuild the entire system to incorporate any new additions. To add a new application (or a new category of commands), in prior art single translation systems, it was necessary to rebuild the entire NLU. In accordance with the invention, all that is needed is to add a new category (with additional sub-categories if needed) at the appropriate translation level, and rebuild the models only for that translation level and the new category, with the models for all other categories left unchanged. From a practical point of view, the user can simply acquire, for example, an Email package, and later purchase the Calendar package and incorporate it seamlessly in to the system, with the models for the Email category remaining unchanged. Categories/models may also be removed seamlessly.

It should be understood that the elements shown in FIGS. 1-4 may be implemented in various forms of hardware, software or combinations thereof. Preferably, these elements are implemented in software on one or more appropriately programmed general purpose digital computers having a processor and memory and input/output interfaces. Referring now to the drawings in which like numerals represent the same or similar elements and initially to FIG. 1, a system 8 is shown which includes a natural language understanding (NLU) engine 12, connecting to a set of applications 16. Input 10 to the system includes a string of natural language text which may come from one of many sources. Sources may include output from speech and writing recognition systems, direct text from a personal digital assistant (PDA) or a pager or other similar devices. If the system supports speech recognition, then the user's spoken input may be converted to text by a speech recognition engine (not shown). If the system supports handwriting recognition, the user's written input may be converted to text by a handwriting recognition engine (not shown). The text input may also be generated directly by the user via a computer keyboard input or a similar input mechanism.

The text input 12 may be in a natural language form. For example, if the application is an electronic mail application, then text input may be "do I have any new messages" or "show me the first message". The NLU engine 12 translates the text input 10 to a formal command 14 corresponding to the user's intended meaning. For example, text inputs such as "do I have any new messages", or "can you check my mailbox", or "did I get some new email", will all be translated to a formal command which may be of the form: checkNewMail( ). The NLU engine 12 therefore permits the user to interact with the application using natural language. The translated formal command is sent to the application for execution of the command.

Typical NLU engines attempt to translate natural language text to a formal command directly, and use techniques such as statistical parsing and maximum entropy based translation techniques, known in the art, to accomplish the translation. This direct one-step approach to NLU may work satisfactorily when the number of formal commands is small.

The present invention provides a generalization to the classical NLU methodology, whereby the translation from natural language to formal commands is done in a hierarchical manner. Formal command 14 is provided by employing a hierarchical translation using at least one level for translating the formal command 14 from the input text 10.

Figure 2:
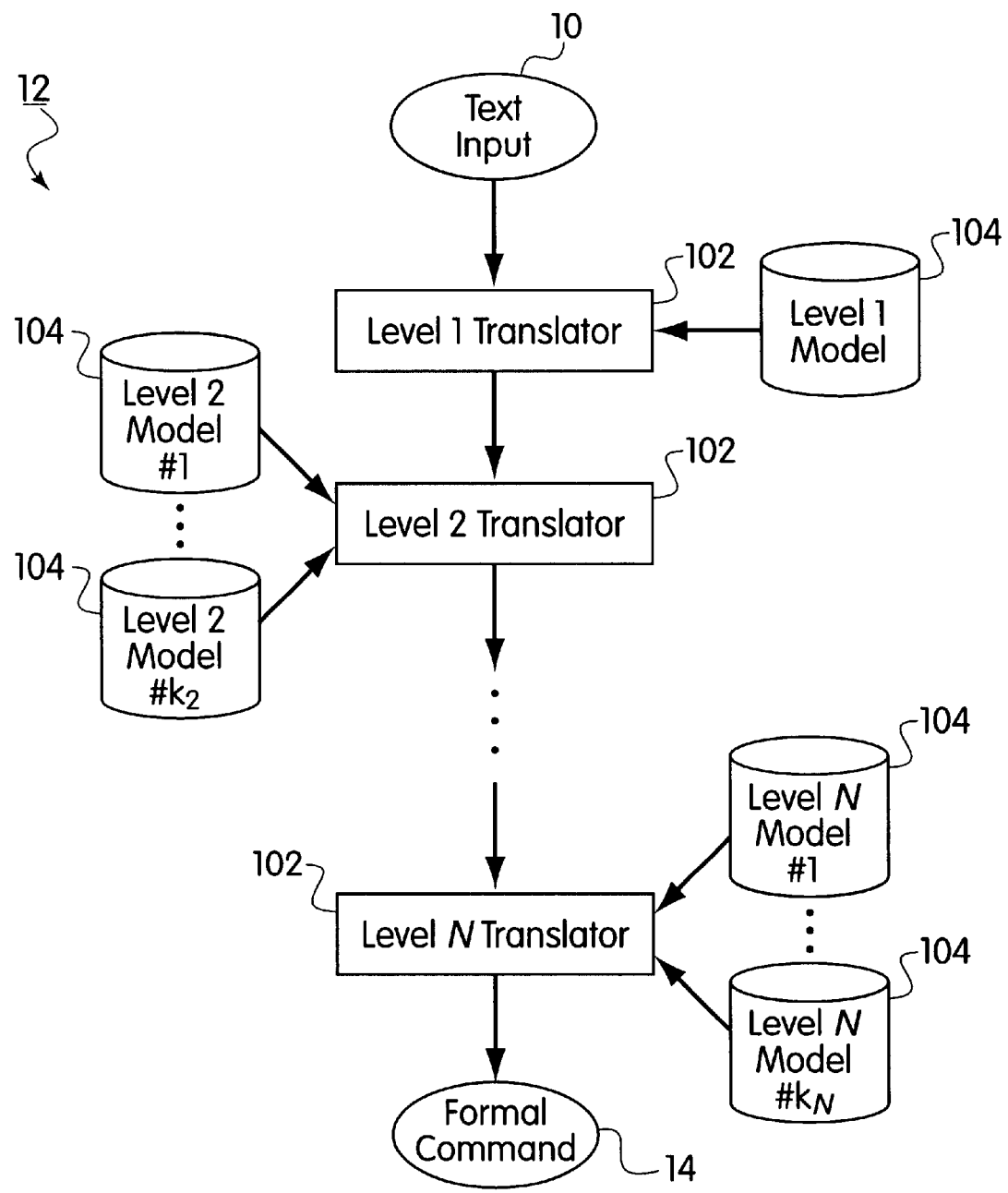
FIG. 2 is a block diagram of an illustrative hierarchical natural language understanding engine in accordance with the present invention.

Referring to FIG. 2, an example of the hierarchical system/method for NLU 12 is shown in accordance with the present invention. NLU 12 shows N translators 102, ranging from a Level 1 translator to a Level N translator. Each translator 102 performs one portion of the translation process, and narrows down the search space of formal commands to be translated from input text 10 for the subsequent level. Level 1 translator takes in the text input 10 and initiates the translation process, and Level N translator concludes the translation process by producing the formal command 14 associated with the text input 10. The value of N is a system parameter and is preferably chosen by the system builder to optimize the NLU system 8 for a given set of applications 16 (FIG. 1).

Translators 102 of a hierarchical NLU of the present invention includes categorized formal commands. Categories, and nested sub-categories, of the formal commands are defined and each formal command is assigned to one (or more) of these categories and stored in models 104. In general for Level i, there will be $k_i$ categories. For Level 1, the usual choice is $k_1=1$. For subsequent levels, the value of $k_i$ for each level i is an application dependent system parameter that is chosen by the system builder.

For example, consider the case of applications in a Personal Information Management (PIM) scenario involving electronic mail and electronic calendar applications. For this example, the Level 2 categories may be defined to be Email, Calendar, General, and DoNothing.

In this case, individual applications (e.g., email, calendar, etc.) are chosen as the basis for defining the categories. This is one of many possible ways to define categories. For example, categories may be based on other criteria, such as, the type of command, etc. The Email category may includes sentences (or words) such as:

do I have any new mail // cheak_new_mail()
open the message from John // open_mail_message(sender=John)

The actual sentences (which are to be considered when input as text) are shown on the left, and the corresponding formal command is shown on the right. Similarly, the Calendar category may include sentences (or words) such as:

what is the date tomorrow // query_date(day=tomorrow)
create a meeting with David at ten o'clock //create_calendar_entry(name=David, start_time=10)

The General category provides for sentences which may be ambiguous, such as:

open this // open_object (object=current)
go to the next one // select_object (object=next)
okay // affirmation ()
cancel that // undo()

In these cases, a context history may be used to resolve the full meaning of the command (i.e. to figure out what are the objects or actions that are referenced).

The DoNothing category includes sentences that cannot be reliably translated to a formal command within the domain. This category may include out of domain sentences, poorly phrased sentences or incomplete sentences, such as it is a nice day // do_nothing()
I think may be we // do_nothing()
send this to ah I mean uh // do_nothing()

The system will in general not do anything in response to these sentences, and may ask the user to repeat the command. The DoNothing category plays an role in assuring the robustness of the system. The DoNothing commands are described in greater detail in commonly assigned U.S. Application No. Ser. No. 09/390,308 entitled "METHOD AND SYSTEM FOR ENSURING ROBUSTNESS IN NATURAL LANGUAGE UNDERSTANDING," filed concurrently herewith and incorporated herein by reference.

Each of the Level 2 categories can be further divided into two or more Level 3 categories. For example, the Level 2 Email category may be divided into Level 3 categories such as "folder manipulation" and "message manipulation". As noted earlier, the number of levels and the number of categories in each level are system parameters which are preferably chosen by the system builder.

Figure 3:
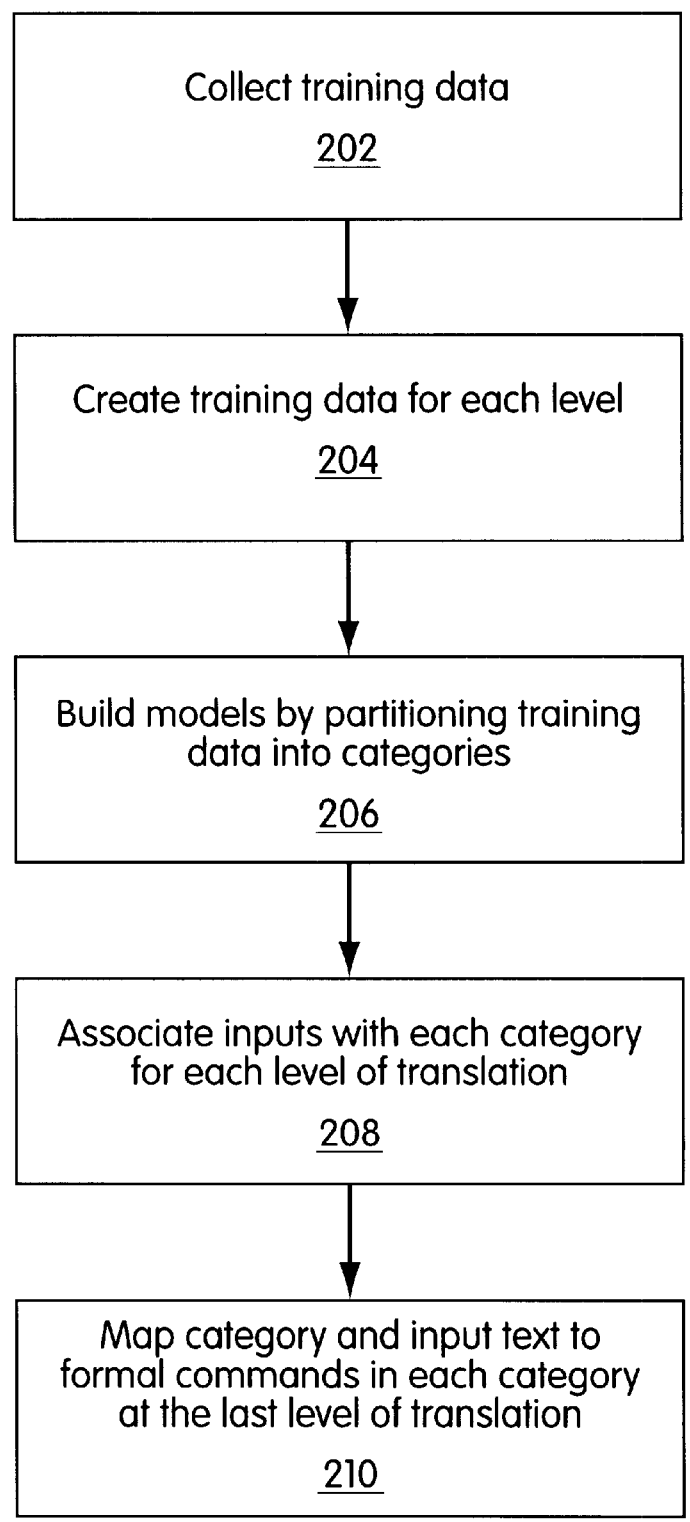
FIG. 3 is a block/flow diagram showing a system/method for building a hierarchical translation system in accordance with the present invention; and FIG, 4 is a block/flow diagram showing a system/method including a scoring system and models including all entities which may be employed for correcting errors in translation in accordance with the present invention.

Referring to FIG. 3, construction of models for translator levels in accordance with the present invention will now be described. For the purpose of illustration, the present invention will illustratively be described using 2 levels (i.e., let N=2 in FIG. 2). The PIM example described earlier will also be used to illustratively demonstrate the invention. In block 202, the collection of a large amount of training data from a given domain is performed. The training data includes relevant sentences from the domain, for example, application specific sentences or words. Then, in block 204, a training data file is created for each Level in the translation process, to indicate the desired output at that level. For example, the training data for Level 1 provides outputs for the 4 categories described in the PIM example (Email, Calendar, General, and DoNothing). Construction of the categories may be based on the applications supported by the NLU (Email, Calendar, etc.), and/or subcategories based on the task intended by the user input (message manipulation or folder manipulation for the Email category, for example). Construction of the categories may also be based on the nature of the user input, for example, query, action, help, etc. Level 1 training data may include entries such as:

```
do have any new mail // Email
open the message from John // Email
what is the date tomorrow // Calendar
create a meeting with David at ten o'clock // Calendar
open this // General
go to the next one // General
okay // General
cancel that // General
it is a nice day // DoNothing
I think may be we // DoNothing
send this to ah I mean uh // DoNothing
```

On the left hand side, the entries are the actual sentences, and on the right hand side are the desired Level 1 outputs, as discussed earlier. Notice that since 4 categories exist for Level 2, there are 4 four possible outputs for Level 1. In block 206, Level 1 models are built. This may be done using any standard techniques in Natural Language Understanding, for example the maximum entropy based technique may be employed as described in Papineni, K., et al., "Feature-Based Language Understanding," EUROSPEECH, Rhodes, Greece, 1997, incorporated herein by reference. In block 208, a Level 1 translator translates the text input into one of the four categories of Level 2. This is performed for each level of translator.

In block 210, the Level 2 translator takes the text input along with the output of the Level 1 translator (which would be one of the four categories described in the example above) and produces the final formal command. (In the most general case, where there may be more than 2 levels, Level 2 output would be one of the categories for Level 3, and so on. Since in this example there are only 2 levels, Level 2 produces the final formal command). As noted earlier, there will be $k_2$=4 and so there are 4 categories and hence 4 corresponding Level 2 models (i.e. Level 2 Model 1, . . . , Level 2 Model 4; see FIG. 2). The training data will be partitioned into 4 different sets, corresponding to each category. For example, the training data for the Email category, which may be used to build Level 2 Model 1, may include entries such as:

```
do have any mail // check_new_mail()
open the message from John // open_mail_message (sender=John)
``` and similarly, the other three training data sets will include entries relevant to the respective category. The desired formal command is now indicated as the output for the input text instead of a category. Again, any NLU technique may be employed to build the Level 2 models, for example, the maximum entropy based technique. With the Level 2 models built as described, the Level 2 translator will examine the Level 1 output and load the appropriate Level 2 model corresponding to the category chosen by Level 1. Then, the Level 2 translator will translate the text input into one of the formal commands for that category and this formal command 14 (FIG. 1) will be the output of the natural language understanding engine 12 (FIG. 1), and will be submitted to the application 16 (FIG. 1).

The hierarchical NLU system of the present invention uses two or more levels of decision making to arrive at a formal command. The system/method may include other variations to further improve the performance of the hierarchical NLU system.

Figure 4:
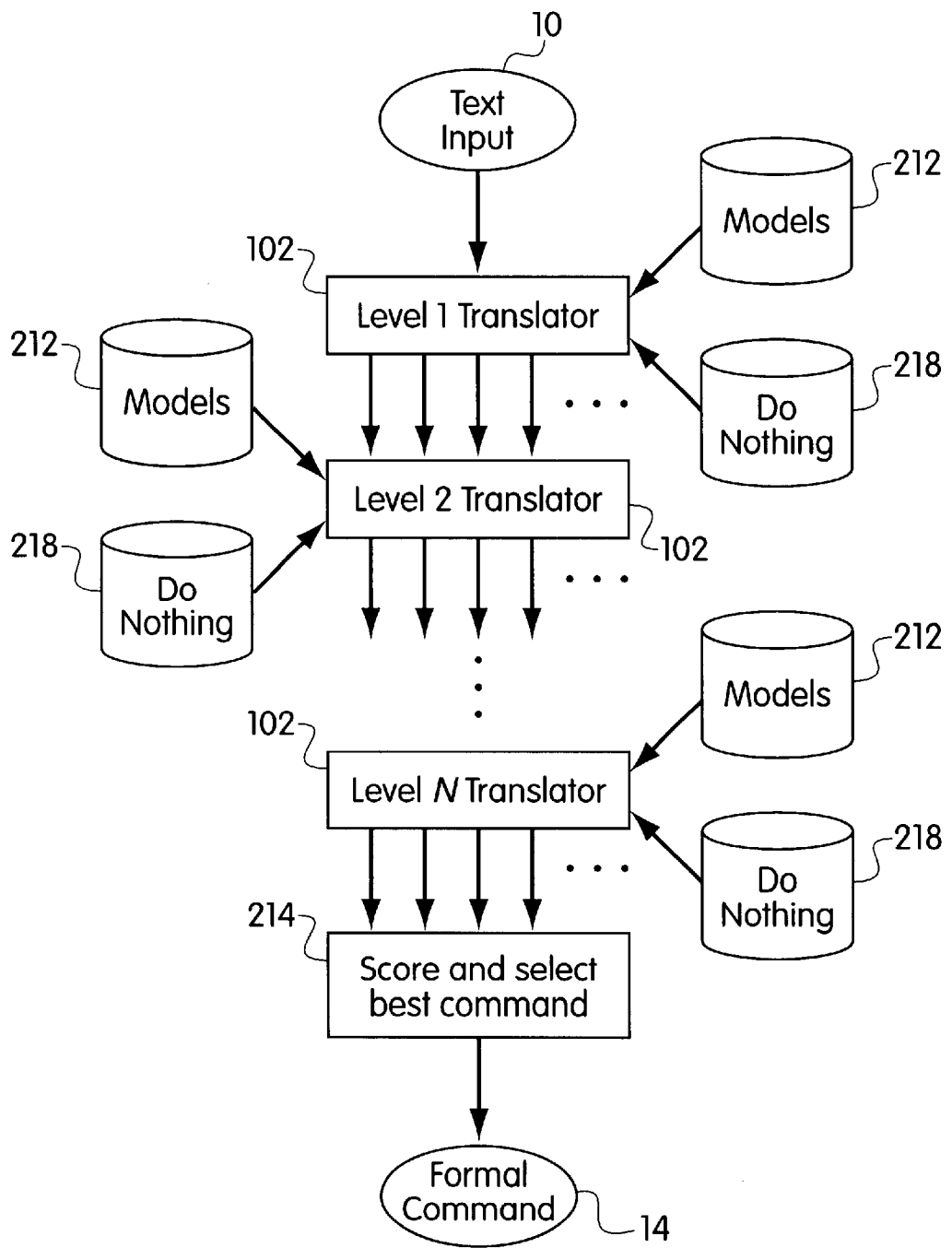

Referring to FIG. 4, an embodiment of the present invention may be employed to improve the accuracy of the NLU 12 by considering more than the top ranking output from any intermediate level for subsequent levels. For example, instead of just considering the first choice of Level 1 output as the category selected for Level 2 translation, the top two or more choices of the Level 1 translation may be considered. For example, if for a given input sentence, the top two choices of Level 1 translation are Email and Calendar, then the Level 2 translation may be done for both of these categories, and the formal command with the highest combined score of Level 1 and Level 2 translation (which may be computed as a product of the individual Level 1 and Level 2 scores or by other methods) may be selected, in block 214, as the final formal command. More than two categories may be selected as well, but as the number of categories increases, so does the computational complexity. The number of categories to be selected should be determined by the system designer to optimize the performance of a given system.

One method for selecting the number of categories dynamically for each user input is to use a threshold method. Whenever the NLU translation score for the top choice for a particular translation level exceeds a predetermined threshold, only the top choice needs to be considered. Otherwise, two or more top choices may be selected for that translation level so that the combined score exceeds the threshold. For example, suppose the NLU scores range from 0 to 1, with the higher scores (closer to 1) indicating greater confidence in the translation, and suppose the threshold has been set to 0.6. For the electronic mail and calendar application that has been discussed above, if a particular user input results in Level 1 translation with a score of 0.5 for Email, 0.4 for Calendar and 0.1 for DoNothing, then both the Email and Calendar categories for Level 2 search need to be selected because the score for Email is less than the threshold of 0.6 but the combined score for Email and Calendar satisfies the threshold. With this modification, the threshold is preferably selected by the system designer.

In blocks 212, another option includes modifying the training data sets for Level 2 (and all subsequent levels, if any) to include not just the entries relevant to the category but all the entries. For example, the training data for Level 2 Model 1 (for the Email category) may include entries such as

```
do have any new mail // check_new_mail()
open the message from John // open_mail_message(sender=John)
what is the date tomorrow // Error
create a meeting with David at ten o'clock // Error
open this // Error
go to the next one // Error
okay // Error
cancel that // Error
it is a nice day // Error
I think may be we // Error
send this to ah I mean uh // Error
```

The entries that are relevant to the given category, such as the first two entries above, are mapped to the correct formal command. Other entries are included, and are marked as an "Error", for example, to indicate that these sentences do not belong to the current category. One purpose for doing this is to correct errors that may have been made at an earlier level. For example, if the sentence "what is the date tomorrow" is incorrectly translated at Level 1 as belonging to the Email category (it should really belong to the Calendar category), then while making the Level 2 translation, it is possible to recognize that the Level 1 translator may have made an error. Whenever Level 2 translation results in an error, a second choice of the Level 1 output is considered. If the second choice of the Level 1 translator happens to be the correct category, then it is likely that the subsequent attempt at Level 2 translation for the same command may result in the correct formal command. If even the second choice of the Level 1 output happens to lead to a Level 2 error, then a third choice is tried and so on until all choices are exhausted. If all choices of the Level 1 output result in a Level 2 error, then the sentence is automatically mapped to the DoNothing category, in block 218, and in this case, the user will be asked to rephrase the input. This variation ensures additional robustness of the NLU system by reducing the consequences of intermediate errors in the hierarchical translation.

As noted earlier each formal command may be assigned to one or more categories at each level of the translation. In all of the examples considered so far, each formal command was assigned to only one category, but in general, some formal commands may have to be mapped to two or more categories. In particular, if we do not use the General and DoNothing categories at Level 1, then it is desirable to include the entries that would otherwise belong to these categories to all other relevant categories. For example, in the absence of a General category, entries such as

```
okay // affirmation()
``` should be included in both the Email and Calendar categories since this command may be relevant to both of these categories. The General category can be used in a variety of situations to cover ambiguous commands, commands relevant to more than one category, or commands related to the system in general (such as, for example, login to the system, connect to server, reboot system, etc.)

In addition to the General category, or instead of that category, certain formal commands can be assigned to more than one category. This is particularly useful for commands that are frequently used where errors in the understanding of those commands cannot be tolerated. By including these commands in more than one category, protection against possible errors in the intermediate levels of translation is provided since now these commands can be selected even when the intermediate levels make an error (because these commands are part of several, and possibly all, categories).

Experiments were conducted by the inventors to evaluate one embodiment of the present invention for providing improvements in NLU translation accuracy and speed. Both a prior art NLU system (which performs the translation in a single step) and a hierarchical NLU according to the present invention were built for the electronic mail and calendar applications discussed earlier. Using a collection of approximately 6000 sentences both of these systems were tested, and the NLU translation error rate was found to be about 8.79% for the prior art NLU system, but advantageously, only about 6.52% for the hierarchical NLU built according to the present invention. Furthermore, the total CPU time used for the NLU translation of the entire collection of 6000 sentences was 404 seconds for the prior art NLU, but only 122 seconds for the hierarchical NLU. The present invention therefore provides significant improvements to both the accuracy and the speed of NLU systems. The parameters and the results of the above experiment is only an illustration of the present invention. Further improvements to speed and accuracy are also contemplated.

Having described preferred embodiments of a system and method for hierarchical natural language understanding (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for hierarchical translation of input to a formal command in a natural language understanding system comprising the steps of:

presenting an input command to be translated to a natural language understanding engine;

providing at least two translator levels in the natural language understanding engine;

translating the input command into at least one category by a first translator level of the at least two translator levels by associating the input command with the at least one category for a next level of translators; and outputting a formal language command for the input command from a last of the at least two translator levels based on the input command and the at least one category.

2. The method as recited in claim 1, wherein the step of providing at least two translator levels includes providing N translator levels where N is defined as a system parameter.

3. The method as recited in claim 1, wherein the step of translating the command into at least one category includes the step of providing a plurality of models, each model being associated with a category, each category including a subset of formal language commands to narrow a search space for determining the formal language command corresponding to the input command.

4. The method as recited in claim 1, further comprising the step of applying the formal language command to at least one application.

5. The method as recited in claim 1, wherein the at least one category includes formal language command entries relevant to at least one application and further comprising the step of applying the formal language command entries to the at least one application in accordance with the input command.

6. The method as recited in claim 1, wherein the at least one category includes all entries for the input command and further comprising the step of associating a first portion of the entries with the at least one category by providing a formal command for each of the entries relevant for the at least one category.

7. The method as recited in claim 6, further comprising the step of mapping a second portion of the entries to an error command.

8. The method as recited in claim 1, wherein the at least one category includes a do nothing category and the step of outputting a formal language command includes the step of outputting a do nothing command associated with incomplete and improper input commands.

9. The method as recited in claim 1, wherein the at least one category includes a general category for addressing ambiguous commands, commands relevant to multiple categories and system related commands.

10. The method as recited in claim 1, wherein the at least two translator levels search for a category selection for a next translator level or search for the formal language command for the last level, the category selection being limited to a given category from a previous level translator thereby narrowing a search space for each translator level to improve speed and accuracy.

11. A method for hierarchical translation of input to a formal command in a natural language understanding system comprising the steps of:
    presenting an input command to be translated to a natural language understanding engine;
    providing a plurality of translator levels in the natural language understanding engine;
    providing a plurality of categories for each translator level, each category including a group of formal language commands stored in at least one model;
    associating the input command with the categories for a given translator level;
    scoring a probability of correct translation for each of the at least two categories;
    selecting a category of the at least two categories yielding a highest score;
    associating the input command with the selected category for a next level of translators; and
    outputting a formal language command for the input command from a last of the translator levels based on the input command and the selected category.

12. The method as recited in claim 11, wherein the step of providing a plurality of translator levels includes providing N translator levels where N is defined as a system parameter.

13. The method as recited in claim 11, wherein each category includes a subset of formal language commands to narrow a search space for determining the formal language command corresponding to the input command.

14. The method as recited in claim 11, further comprising the step of applying the formal language command to at least one application.

15. The method as recited in claim 11, wherein the categories include formal language command entries relevant to at least one application and further comprising the step of applying the formal language command entries to the at least one application in accordance with the input command.

16. The method as recited in claim 11, wherein the at least two categories include all entries for the input command and further comprising the step of associating a first portion of the entries with a given category by providing a formal command for each of the entries relevant for the given category.

17. The method as recited in claim 16, further comprising the step of mapping a second portion of the entries to an error command.

18. The method as recited in claim 11, wherein the step of selecting a category of the at least two categories yielding a highest score includes the step of selecting a category with a lower score if a translation error is encountered for a category or categories yielding a higher score.

19. The method as recited in claim 18, further comprising the step of, if a translation error is encountered for all scored categories, selecting a do nothing category.

20. The method as recited in claim 11, wherein at least one category includes a do nothing category and the step of outputting a formal language command includes the step of outputting a do nothing command associated with incomplete and improper input commands.

21. The method as recited in claim 11, further comprising the step of assigning formal language commands to multiple categories to protect against translation errors in intermediate levels of the plurality of translator levels.

22. A program storage device readable by machine, tangibly embodying a program of instructions executable by the machine to perform method steps of claim 11.

23. A method for building hierarchical models for translating an input command to a formal command in a natural language understanding system comprising the steps of:
    collecting training data from a domain of inputs;
    separating the training data into translation levels, the translation levels arranged to provide a given output at each level for associating the inputs to a category, the training data including the inputs and an associated formal language command for each input;
    for each translation level, indicating categories for searching for a formal language command by dividing up a formal language command search space and associating the categories with each input; and
    associating each input with the formal language command in a last translation level.

24. The method as recited in claim 23, wherein the step of indicating categories for searching for a formal language command includes the step of constructing the categories based on applications supported by the natural language understanding systems.

25. The method as recited in claim 24, wherein the step of constructing the categories based on applications supported by the natural language understanding systems includes the step of constructing subcategories based on a task intended by user input.

26. The method as recited in claim 23, wherein the step of indicating categories for searching for a formal language command includes the step of constructing the categories based on a nature of a user's input.

27. The method as recited in claim 23, further comprising the step of packaging models for each category such that models of categories are capable of being added or removed without affecting models of other categories.

28. A program storage device readable by machine, tangibly embodying a program of instructions executable by the machine to perform method steps for hierarchical translation of input to a formal command in a natural language understanding system, the method steps comprising:

presenting an input command to be translated to a natural language understanding engine;

providing at least two translator levels in the natural language understanding engine;

translating the input command into at least one category by a first translator of the at least two translators by associating the input command with the at least one category for the next level of translators; and outputting a formal language command for the input command from a last of the at least two translator levels based on the input command and the at least one category.

29. The program storage device as recited in claim 28, wherein the step of providing at least two translator levels includes providing N translator levels where N is defined as a system parameter.

30. The program storage device as recited in claim 28, wherein the step of translating the command into at least one category includes the step of providing a plurality of models, each model being associated with a category, each category including a subset of formal language commands to narrow a search space for determining the formal language command corresponding to the input command.

31. The program storage device as recited in claim 28, further comprising the step of applying the formal language command to at least one application.

32. The program storage device as recited in claim 28, wherein the at least one category includes formal language command entries relevant to at least one application and further comprising the step of applying the formal language command entries to the at least one application in accordance with the input command.

33. The program storage device as recited in claim 28, wherein the at least one category includes all entries for the input command and further comprising the step of associating a first portion of the entries with the at least one category by providing a formal command for each of the entries relevant for the at least one category.

34. The program storage device as recited in claim 33, further comprising the step of mapping a second portion of the entries to an error command.

35. The program storage device as recited in claim 28, wherein the at least one category includes a do nothing category and the step of outputting a formal language command includes the step of outputting a do nothing command associated with incomplete and improper input commands.

36. The program storage device as recited in claim 28, wherein the at least one category includes a general category for addressing ambiguous commands, commands relevant to multiple categories and system related commands.

37. The program storage device as recited in claim 28, wherein the at least two translator levels search for a category selection for a next translator level or the formal language command for the last level, the category selection being limited to a top choice category from a previous level translator thereby narrowing a search space for each translator level to improve speed and accuracy.

* * * * *